April 26, 1927.
W. E. QUILLEN
1,626,552
FOUNTAIN SOLDERING IRON
Filed July 10, 1925
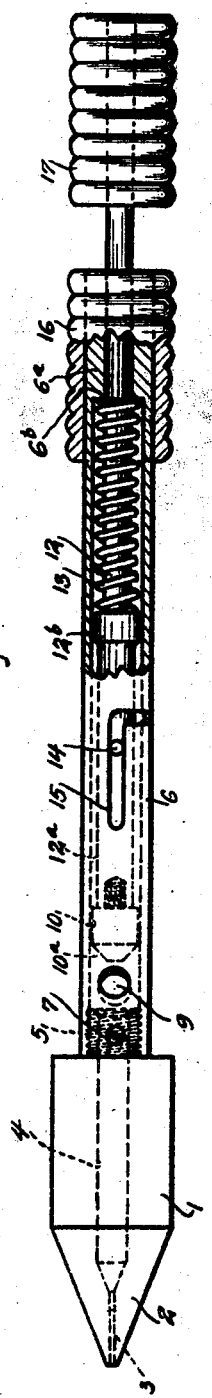
W. E. QUILLEN.
INVENTOR
BY *Victor J. Evans*
ATTORNEY Patented Apr. 26, 1927.

1,626,552

UNITED STATES PATENT OFFICE.

WRIGNOL E. QUILLEN, OF PITTSBURGH, PENNSYLVANIA, ASSIGNOR OF ONE-THIRD TO FRANCES SPITZ, OF PITTSBURGH, PENNSYLVANIA.

FOUNTAIN SOLDERING IRON.

Application filed July 10, 1925. Serial No. 42,804.

This invention relates to soldering tools, and more particularly to what I term a fountain soldering iron.

One of the main objects of the invention is to provide a soldering iron of simple construction and operation which may be readily produced at small cost. A further object is to provide a soldering iron which is free of all unnecessary projections and is adapted for use in restricted spaces, as in radio work. Another object is to provide an iron of this character in which the solder is supplied continuously to the tip of the iron during the soldering operation, the soldering iron being thus well adapted for use in soldering together comparatively long strips of metal. Further objects will appear from the detail description.

In the drawings:—

Figure 1 is an elevation, partly broken away, of a soldering iron constructed in accordance with my invention;

Figure 2 is a central sectional view through the head and associated parts of the iron;

Figure 3 is an inner end view of the valve rod and associated parts;

Figure 4 is an elevation of the valve rod and associated parts.

The soldering iron includes a head 1 formed of copper or other suitable material, this head being provided with a tapered tip 2 from the apex of which extends an outlet duct 3 which communicates with a space forming a reservoir 4 positioned centrally of head 1. The head is also provided, at its upper end, with a neck 5 which forms a continuation of reservoir 4 and is exteriorly threaded to receive a barrel 6 which is screwed tightly onto the neck and is secured against reverse rotation by a set screw 7, or in any other suitable or preferred manner. The neck 5 has its outer end countersunk to provide a valve seat 8 and barrel 6 is provided with an opening 9 which is inclined downwardly and inwardly of the barrel toward seat 8. This provides simple and efficient means whereby solder in the form of a stick or wire can be inserted into barrel 6 and through neck 5 into head 1. In practice, the head 1 is heated to the proper temperature for melting the solder and the solder is then inserted through opening 9 into the head, the wire or stick being fed through opening 9 as the solder is melted and flows into reservoir 4. During this operation the tip is placed upon a piece of asbestos or any other suitable material to prevent the solder from running out of duct 3. In this manner the reservoir 4 can be quickly and easily filled with molten solder.

Valve seat 8 is adapted for reception of the frusto-conical terminal portion $10^a$ of a valve 10 of copper or other suitable material which is secured by means of a screw stud 11, or in any other suitable or preferred manner, to the inner end of an enlarged portion $12^a$ of a valve rod 12 which is slidable through the outer end $6^a$ of barrel 6, the barrel being reduced in interior diameter a short distance from its outer end to provide a shoulder $6^b$. An expansion coil spring 13 is mounted about rod 12 and is confined between shoulder $6^b$ and a shoulder $12^b$ formed at the outer end of the enlarged portion $12^a$ of rod 12. A pin 14 is secured in portion $12^a$ of rod 12 and projects through a bayonet slot 15 provided in barrel 6. A corrugated handle member 16 is secured on the outer end of barrel 6 and a similar member 17 is secured on the outer end of rod 12.

In using the iron the head 1 is first heated in any well known manner to the proper temperature to fuse solder inserted into the head through opening 9, after which the solder is inserted into the head until the required quantity of molten solder is in reservoir 4, the reservoir being ordinarily filled or approximately so with solder. During this operation rod 12 is held in retracted position by being pulled outwardly through barrel 6 by means of handle member 17, the rod being then turned so that pin 14 engages in the portion of bayonet slot 15 which is disposed circumferentially of the barrel. After the desired amount of molten solder has been placed in reservoir 4 of head 1, rod 12 is turned so as to position pin 14 in the portion of bayonet slot 15 which extends longitudinally of the barrel, after which spring 13 acts to move the rod inwardly of the barrel so as to seat valve 10 in neck 5, this valve being a snug fit in valve seat 8 so as to prevent entry of air into the neck. When valve 10 is in its operated or seated position, no solder will, under ordinary conditions, flow out of duct 3. By slightly jarring or shaking the iron a drop of solder can be caused to form at the tip of the iron, this drop being readily available for use as when soldering small joints. When the drop of molten solder on the tip or point of head 1 is touched against the metal to be soldered it will congeal and adhere thereto and there will also be a tendency for the solder extending from this drop into duct 3 to congeal to a certain extent so that if the iron is moved over or about the metal being soldered and the point of tip 2 is maintained in contact with the metal, solder will be drawn out of the head through duct 3. In this manner the desired amount of solder is supplied to the joint being soldered and when it is desired to break or stop the flow of the solder, this can be readily done by tilting the iron so as to move the tip thereof an appreciable distance away from the metal being soldered, after which the portion of tip 2 remote from the point thereof can be used to spread out or uniformly distribute the solder over the joint. This iron is particularly useful in soldering long pieces or strips of metal together. When using the iron in this manner, the strips to be soldered are placed together, after which the iron is shaken slightly to cause a drop of solder to form on the point of the tip and this drop of solder is then applied to the metal strips at the point where the soldering is to start. The iron is then drawn slowly along the metal strips and during this movement of the iron the solder is drawn out of head 1 so as to form a neat joint, the solder being quickly and accurately applied. In this connection I deem it of importance that, if the metal being soldered is not thoroughly cleaned or is at all oily or greasy, the solder will not adhere to the metal and, for this reason, will not be drawn out of the head through duct 3. This causes the stream or string of solder which is drawn from the head to be broken at any points where the metal is not clean or is greasy or oily, thus apprising the operator of this fact so that the metal can be properly cleaned at such points, after which the soldering operation can be readily continued. This renders it possible to very quickly and accurately solder together strips of metal, as well as joints of various sorts. This iron is particularly well adapted for use in radio work and other work of a similar character in which the space for soldering together joints and for soldering wires to various devices is frequently very restricted. In using my iron, after the joint to be soldered has been prepared, a drop of solder is caused to form on the point of tip 2 by slightly shaking the iron, after which this solder can be readily placed upon the joint about which it will readily flow and by slightly tilting the iron the flow of any additional solder to the joint can be prevented. It will be noted that the iron is so constructed as to be free of all unnecessary projections well adapting it for use in very restricted spaces and, in addition, the device as a whole is of simple and inexpensive construction and operation.

What I claim is:—

1. In a soldering iron, a head provided with a reservoir for reception of molten solder and with an outlet duct communicating with said reservoir, the head having a neck extending from its upper end and forming a continuation of said reservoir, the upper end of said neck being countersunk to form a valve seat, a barrel secured about the neck and provided with an opening adjacent the upper end of the neck and inclined downwardly and inwardly of the same, a valve slidable in the barrel toward and away from the neck and adapted for seating therein, and means for moving said valve into and out of operative position.

2. In a soldering iron, a head provided with a reservoir for reception of molten solder and with an outlet duct communicating with said reservoir, the head having a neck extending from its upper end and forming a continuation of said reservoir, the upper end of said neck being countersunk to form a valve seat, a barrel secured about the neck and provided with an opening adjacent the upper end of the neck, a handle member on said barrel a rod slidable in the barrel for movement toward and away from the same, a handle member on said rod, a valve carried by the inner end of the rod and adapted for seating in said valve seat, means urging the rod toward the neck, means for releasably securing the rod in retracted position with the valve remote from the neck, and said handle members cooperating to provide a unit when the last mentioned means is released.

In testimony whereof I affix my signature.

WRIGNOL E. QUILLEN.